(12) United States Patent
Watanabe (10) Patent No.: US 11,409,144 B2
(45) Date of Patent: Aug. 9, 2022

(54) OPTICAL ISOLATOR

(71) Applicant: SHIN-ETSU CHEMICAL CO., LTD., Tokyo (JP)

(72) Inventor: Toshiaki Watanabe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 145 days.

(21) Appl. No.: 16/094,147

(22) PCT Filed: Mar. 31, 2017

(86) PCT No.: PCT/JP2017/013558
§ 371 (c)(1),
(2) Date: Oct. 16, 2018

(87) PCT Pub. No.: WO2017/187886
PCT Pub. Date: Nov. 2, 2017

(65) Prior Publication Data
US 2019/0243168 A1 Aug. 8, 2019

(30) Foreign Application Priority Data
Apr. 26, 2016 (JP) .............................. JP2016-087688

(51) Int. Cl.
*G02F 1/09* (2006.01)
*G02B 27/28* (2006.01)

(52) U.S. Cl.
CPC ............. *G02F 1/093* (2013.01); *G02B 27/28* (2013.01); *G02F 1/09* (2013.01)

(58) Field of Classification Search
CPC ...... G02F 1/093; G02F 1/0955; G02F 1/0036; G02F 1/095; G02F 1/09; G02B 6/2746; G02B 6/4208; Y10S 372/703
See application file for complete search history.

(56) References Cited

U.S. PATENT DOCUMENTS 4,804,256 A * 2/1989 Wilson .................... G02F 1/093
359/281
5,519,467 A * 5/1996 Suzuki ................. G02B 6/4208
372/703

(Continued)

FOREIGN PATENT DOCUMENTS

CN 2702335 Y 5/2005
JP 06265819 A * 9/1994 ........... G02B 6/4208

(Continued)

OTHER PUBLICATIONS

English translation of JP-2002014302; retrieved 2021 (Year: 2021).*

(Continued)

*Primary Examiner* — Christopher Stanford
(74) *Attorney, Agent, or Firm* — Oliff PLC (57) ABSTRACT

An optical isolator includes: an optical isolator chip in which a first polarizer, a Faraday rotator made of a ferromagnet, and a second polarizer are bonded and fixed in this order; and a magnet for applying a magnetic field to the optical isolator chip. A light-entering end surface or a light-exiting end surface of the optical isolator chip is bonded and fixed to a component. On an optical axis of the optical isolator, a center of a magnetic flux formed by the magnet is positioned closer to the end surface side bonded and fixed to the component than a central position of the Faraday rotator on the optical axis. The optical isolator has high bonding reliability to the component.

8 Claims, 5 Drawing Sheets

(56) References Cited

U.S. PATENT DOCUMENTS

| | | | |
|---|---|---|---|
| 5,691,845 A | 11/1997 | Iwatsuka et al. | |
| 5,760,946 A * | 6/1998 | Yokoi | G02B 6/4208 359/281 |
| 6,028,702 A * | 2/2000 | Sasaki | G02F 1/093 359/484.03 |
| 6,198,567 B1 * | 3/2001 | Bergmann | G02F 1/09 359/281 |
| 6,580,558 B2 * | 6/2003 | Zhu | G02B 5/3083 359/484.03 |
| 10,120,213 B2 * | 11/2018 | Diedrich | G02F 1/093 |
| 2001/0012422 A1 | 8/2001 | Watanabe | |
| 2005/0207710 A1 | 9/2005 | Tanaka et al. | |
| 2013/0258468 A1 * | 10/2013 | Fukui | G02F 1/095 359/484.03 |
| 2014/0300963 A1 | 10/2014 | Yahagi et al. | |
| 2016/0202506 A1 | 7/2016 | Ono et al. | |
| 2019/0243168 A1 | 8/2019 | Watanabe | |

FOREIGN PATENT DOCUMENTS

| | | | |
|---|---|---|---|
| JP | H06242400 A * | 9/1994 | |
| JP | H07-261121 A | 10/1995 | |
| JP | H08-054579 A | 2/1996 | |
| JP | 2744467 B2 * | 4/1998 | |
| JP | 10133146 A * | 5/1998 | |
| JP | H11-119155 A | 4/1999 | |
| JP | H11-167085 A | 6/1999 | |
| JP | 2001-215354 A | 8/2001 | |
| JP | 2002014302 A * | 1/2002 | |
| JP | 2002196282 A * | 7/2002 | |
| JP | 2003043415 A * | 2/2003 | |
| JP | 2003-255270 A | 9/2003 | |
| JP | 2003-329974 A | 11/2003 | |
| JP | 2003315735 A * | 11/2003 | |
| JP | 2004-325606 A | 11/2004 | |
| JP | 2005-242347 A | 9/2005 | |
| JP | 2006-011019 A | 1/2006 | |
| JP | 2008-242423 A | 10/2008 | |
| JP | 2009-031589 A | 2/2009 | |
| JP | 2009-075577 A | 4/2009 | |
| JP | 2011-150208 A | 8/2011 | |
| JP | 2011-215571 A | 10/2011 | |
| JP | 2015-034900 A | 2/2015 | |
| JP | 2015-064407 A | 4/2015 | |
| JP | 6863683 B2 | 4/2021 | |
| TW | 201337339 A | 9/2013 | |

OTHER PUBLICATIONS

Jun. 23, 2020 Office Action issued in Japanese Patent Application No. 2016-87688.
Nov. 13, 2019 Office Action issued in Taiwanese Patent Application No. 106113631.
May 25, 2020 Office Action issued in Taiwanese Patent Application No. 106113631.
Mar. 3, 2020 Office Action issued in Japanese Patent Application No. 2016-87688.
Jun. 13, 2017 Search Report issued in International Patent Application No. PCT/JP2017/013558.
Oct. 30, 2018 International Preliminary Report on Patentability issued in International Patent Application No. PCT/JP2017/013558.
Feb. 5, 2019 Office Action issued in Japanese Patent Application No. 2016-87688.
Oct. 1, 2019 Japanese Office Action issued in Japanese Patent Application No. 2016-087688.
Oct. 30, 2020 Office Action issued in Taiwanese Application No. 106113631.
Jul. 1, 2020 Office Action issued in Chinese Application No. 201780026044.3.
Oct. 20, 2020 Office Action issued in Japanese Applicaiton No. 2016-087688.
Feb. 20, 2021 Office Action issued in Chinese Patent Application No. 201780026044.3.
Sep. 3, 2021 Decision of Refusal issued in Chinese Patent Application No. 201780026044.3.
Nov. 16, 2021 Office Action issued in Japanese Patent Application No. 2021-005930.
Apr. 26, 2022 Office Action issued in Japanese Patent Application No. 2021-005930.

\* cited by examiner

OPTICAL ISOLATOR

TECHNICAL FIELD

The present invention relates to an optical isolator which is an optical component used in optical communication and optical measurement to prevent light, which is reflected from a fiber end or a lens end, from returning to a light-source laser.

BACKGROUND ART

In optical communication and optical measurement, when light emitted from a semiconductor laser returns to the semiconductor laser by reflection at the surface of a component provided in the transmission path, the laser oscillation becomes unstable. To block such reflected return light, an optical isolator using a Faraday rotator which rotates a plane of polarization non-reciprocally is employed (see, for example, Patent Document 1 and so forth).

An optical isolator is, for example, bonded and fixed to an end surface of a stub and integrated with a receptacle in some cases. The optical isolator with such a configuration is incorporated in a semiconductor laser module or the like for use.

CITATION LIST

Patent Document

Patent Document 1: Japanese Unexamined Patent Publication (Kokai) No. 2011-150208

SUMMARY OF INVENTION

Technical Problems

Semiconductor laser modules are required to achieve cost reduction, space saving, weight reduction, and so forth. Similarly, parts constituting such modules are also required to achieve cost reduction, space saving, weight reduction, and so forth.

Moreover, in preparing semiconductor laser modules, detachment or breakage may occur at the bonding interface between an optical isolator and a component such as a stub due to influences from temperature increase and impact by YAG welding, temperature increase by AuSn solder bonding, or the like.

The present invention has been accomplished in view of the problems described above. An object of the present invention is to provide an optical isolator which achieves cost reduction, space saving, weight reduction, and high reliability of bonding to a component even under influences such as thermal expansion, in comparison with conventional products.

Solution to Problems

To achieve the above object, the present invention provides an optical isolator comprising:

an optical isolator chip comprising a first polarizer, a Faraday rotator made of a ferromagnet, and a second polarizer bonded and fixed in this order; and a magnet configured to apply a magnetic field to the optical isolator chip, wherein a light-entering end surface or a light-exiting end surface of the optical isolator chip is bonded and fixed to a component, and on an optical axis of the optical isolator, a center of a magnetic flux formed by the magnet is positioned closer to the end surface side bonded and fixed to the component than a central position of the Faraday rotator on the optical axis is.

With this structure where the center of a magnetic flux formed by the magnet is positioned closer to the end surface side of the optical isolator chip bonded and fixed to the component than the central position of the Faraday rotator on the optical axis is, a force for pressing the optical isolator chip against the component is exerted, enabling an optical isolator having high reliability of bonding to the component. In addition, the magnet is made so compact that the optical isolator achieves cost reduction, space saving, and weight reduction.

In this situation, an end portion of the magnet, which is located on the same side as the end surface side of the optical isolator chip bonded and fixed to the component, may be bonded and fixed to the component.

In this way, when bonding and fixing the component to the end portions of the optical isolator chip and the magnet located on the same side simplifies the structure of the component to which the optical isolator is attached, and can further enhance the bonding reliability of the optical isolator.

In this situation, the component bonded and fixed to the optical isolator chip is preferably integrated with a component bonded and fixed to the magnet, so that a single part is formed.

When the optical isolator chip and the magnet are bonded and fixed to such components integrated to form a single part, the part formed therefrom can be easily produced, and such parts are applicable to various usages.

In this situation, the component bonded and fixed to the optical isolator chip can be a stub of a receptacle.

In this way, when the optical isolator chip and such a stub of a receptacle are bonded and fixed to each other, this can simplify the structure of the receptacle and further enhance the bonding reliability of the optical isolator.

In this situation, the component bonded and fixed to the magnet can be a casing of the receptacle.

In this way, when the optical isolator chip and such a casing of a receptacle are bonded and fixed to each other, this can simplify the structure of the receptacle and further enhance the bonding reliability of the optical isolator.

Advantageous Effects of Invention

The present invention makes it possible to provide an optical isolator which achieves high bonding reliability, cost reduction, space saving, and light weight, in comparison with conventional products.

BRIEF DESCRIPTION OF DRAWINGS

FIG. 1 shows a schematic drawing illustrating an example of an optical isolator of the present invention (FIG. 1(a)), and a schematic diagram illustrating a relation between a center of a Faraday rotator and a center of a magnetic flux (magnet center) (FIG. 1(b)) (Example 1).

FIG. 2 shows a schematic drawing illustrating another example of the inventive optical isolator (FIG. 2(a)), and a schematic diagram illustrating a relation between the center of the Faraday rotator and the center of the magnetic flux (magnet center) (FIG. 2(b)) (Example 2).

FIG. 3 shows a schematic drawing illustrating still another example of the inventive optical isolator (FIG. 3(a)), and a schematic diagram illustrating a relation between the center of the Faraday rotator and the center of the magnetic flux (magnet center) (FIG. 3(b)) (Example 3).

FIG. 4 shows a schematic drawing illustrating still another example of the inventive optical isolator (FIG. 4(a)), and a schematic diagram illustrating a relation between the center of the Faraday rotator and the center of the magnetic flux (magnet center) (FIG. 4(b)) (Example 4).

FIG. 5 shows a schematic drawing illustrating an example of a conventional optical isolator (FIG. 5(a)), and a schematic diagram illustrating a relation between a center of a Faraday rotator and a center of a magnetic flux (magnet center) (FIG. 5(b)).

DESCRIPTION OF EMBODIMENTS

Hereinafter, exemplary embodiments of the present invention will be explained in detail with reference to the drawings, but the present invention is not limited thereto.

FIG. 5(a) is a schematic drawing illustrating a conventional optical isolator. This optical isolator 200 has: an optical isolator chip 7 including a first polarizer 3, a Faraday rotator 4 made of a ferromagnet, and a second polarizer 5 bonded and fixed in this order; and a magnet 62 configured to apply a magnetic field to the optical isolator chip 7. This magnet 62 has a cylindrical shape and surrounds the optical isolator chip 7. In the optical isolator 200, a left end (light-entering end surface or light-exiting end surface) of the optical isolator chip 7 and a left end of the magnet 62 are each bonded and fixed to a metal holder 11.

The optical axis of the optical isolator 200 coincides with the central axis of the cylindrical magnet 62. A magnetic flux is formed between right and left end portions of the magnet 62, and the center of the magnetic flux on the optical axis is defined as magnet center. FIG. 5(b) illustrates a relation between the center of the magnetic flux (magnet center) and a central position of the Faraday rotator 4 (hereinafter, indicated as FR center in the drawing) on the optical axis in the conventional optical isolator 200 bonded and fixed to the component (the metal holder 11). In the conventional optical isolator 200, the center of the magnetic flux (magnet center) is positioned at a right side of the central position of the Faraday rotator 4 on the optical axis, that is, at a side opposite to the end surface side bonded to the metal holder 11. Moreover, FIG. 5(b) also shows a point where the magnet 62 adheres to the metal holder 11 (indicated as magnet adhesion point in the drawing) and a point where the optical isolator chip 7 adheres to the metal holder 11 (indicated as chip adhesion point in the drawing).

A magnetic force from the magnet 62 acts on the Faraday rotator 4 placed in the magnetic field formed by the magnet 62. A force toward the center of the magnetic flux (magnet center) acts on the central position of the Faraday rotator 4 on the optical axis. Specifically, in the structure shown in FIG. 5(a), a force for separating the metal holder 11 and the optical isolator chip 7 is exerted (see the bold arrow in FIG. 5(b)). Hence, detachment or breakage is likely to occur between the metal holder 11 and the optical isolator chip 7. Additionally, when the optical isolator 200 is placed in a high-temperature environment, an adhesive for adhering the optical isolator chip 7 to the metal holder 11 is softened, so that the fixation becomes unstable, and a stress is generated at the bonded portion due to a difference in thermal expansion coefficient between the materials, for example, so that the detachment or breakage is particularly likely to occur.

Next, a configuration of an optical isolator of the present invention will be explained below with reference to a schematic drawing (FIG. 1(a)) illustrating an example of the inventive optical isolator and a schematic diagram (FIG. 1(b)) illustrating a relation between a center of a Faraday rotator and a center of a magnetic flux (magnet center).

The inventive optical isolator 110 shown in FIG. 1(a) has: an optical isolator chip 7 including a first polarizer 3, a Faraday rotator 4 made of a ferromagnet, and a second polarizer 5 bonded and fixed in this order; and a magnet 12 configured to apply a magnetic field to the optical isolator chip 7. A light-entering end surface or a light-exiting end surface of the optical isolator chip 7 is bonded and fixed to a metal holder 11. Moreover, as shown in FIG. 1(b), on an optical axis of the optical isolator 110, the center of a magnetic flux (magnet center) formed by the magnet 12 is positioned closer to the end surface side bonded and fixed to the metal holder 11 than the central position of the Faraday rotator 4 on the optical axis (FR center) is.

With such a structure that the center of the magnetic flux (magnet center) is positioned closer to the bonded- and fixed-end surface side of the optical isolator chip 7 than the central position of the Faraday rotator 4 on the optical axis is, a force for pressing the optical isolator chip 7 against the metal holder 11 is constantly exerted (see the bold arrow in FIG. 1(b)). This enables the optical isolator 110 to have quite high bonding reliability to the component (the metal holder 11). Moreover, it is also possible to shorten the magnet dimensions, so that the cost reduction, space saving, and weight reduction can be achieved.

The force acting on the center of the Faraday rotator 4 is determined by the balance of forces acting on the Faraday rotator 4 in right and left directions in FIG. 1(a). In the case where the center of the magnetic flux (magnet center) coincides with the central position of the Faraday rotator 4 on the optical axis, the forces acting in the right and left directions are almost equal to each other, so that forces hardly act in any of the right and left directions. In other words, in a case where the center of the magnetic flux (magnet center) does not coincide with the central position of the Faraday rotator 4 on the optical axis, a force is exerted such that the central position of the Faraday rotator 4 on the optical axis comes close to the center of the magnetic flux (magnet center). The above-described force for pressing the optical isolator chip 7 against the metal holder 11 is such a force.

In addition, an end portion of the magnet 12, which is located on the same side as the end surface side of the optical isolator chip 7 bonded and fixed to the metal holder 11, may be bonded and fixed to the metal holder 11. In this way, when the end portions of the optical isolator chip 7 and the magnet 12 located on the same side are bonded and fixed to the metal holder 11, this makes it possible to simplify the structure of the component attached to the optical isolator 110, and to further enhance the bonding reliability (bonding stability) of the optical isolator.

Figure 1:
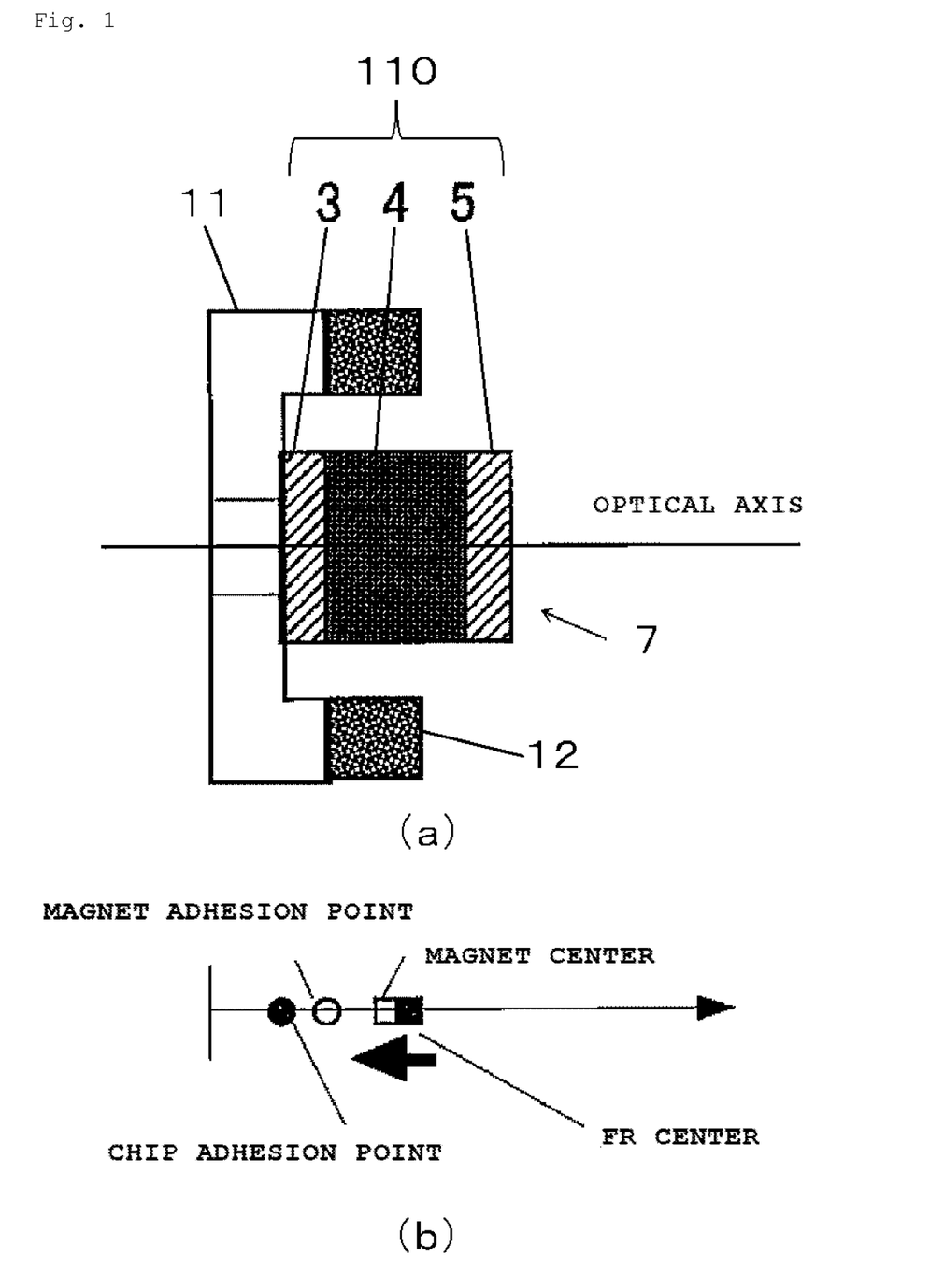
Figure 3:
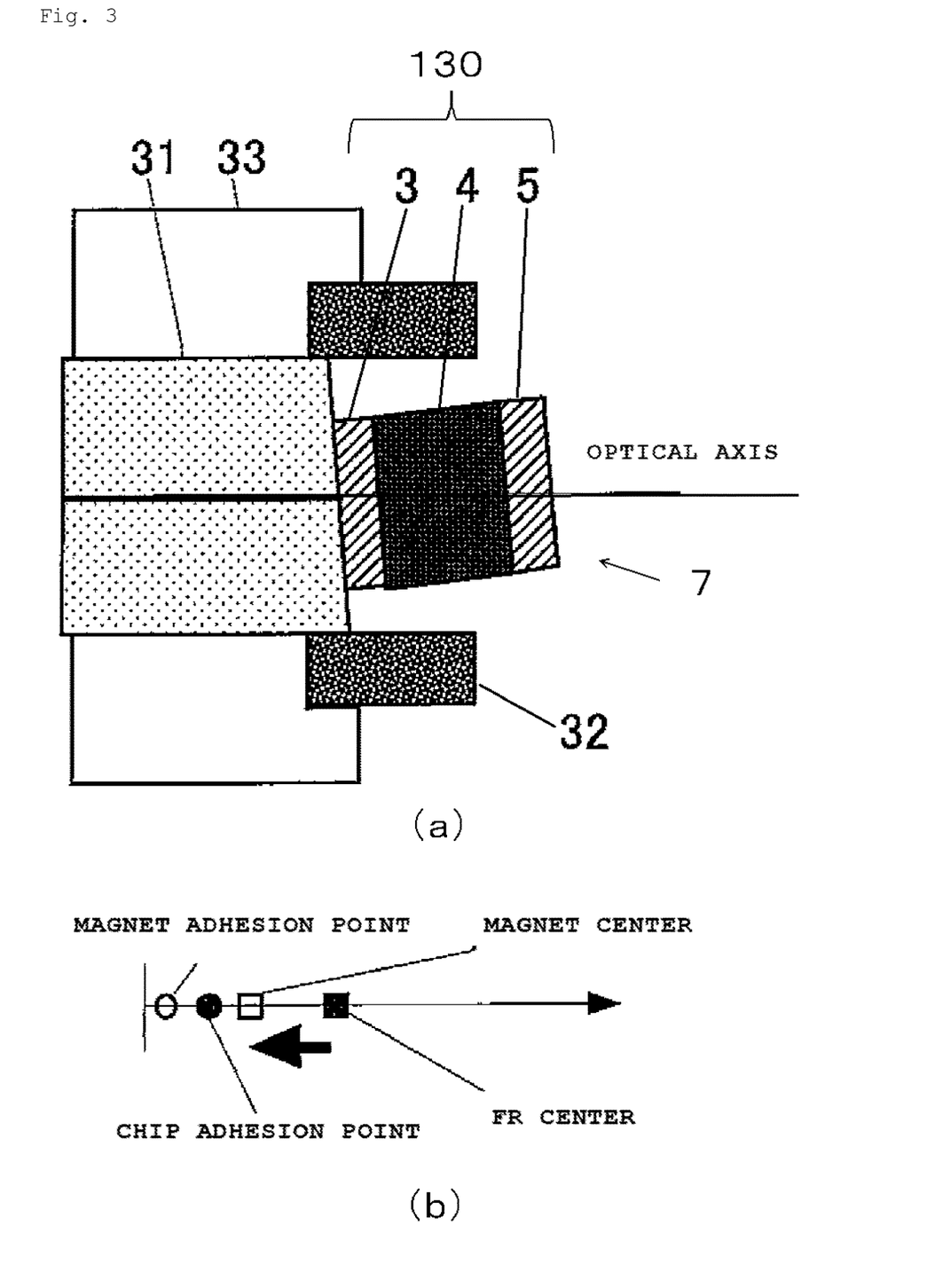

In the inventive optical isolator 110 described with reference to FIG. 1, the optical isolator chip 7 and the magnet 12 are bonded and fixed to the same component. Nevertheless, the present invention is not limited thereto. As shown in FIG. 3(a), the optical isolator chip 7 and the magnet 12 can also be bonded and fixed to components which are integrated to form a single part. For example, the component bonded and fixed to the optical isolator chip may be a stub of a receptacle, while the component bonded and fixed to the magnet may be a casing of the receptacle.

Specifically, a schematic drawing as shown in FIG. 3(a) illustrates another example of the above-described inventive optical isolator, and FIG. 3(b) is a schematic diagram illustrating a relation between the center of the Faraday rotator and the center of the magnetic flux (magnet center). In the embodiment shown in FIG. 3(a), the component bonded and fixed to the optical isolator chip 7 can be a stub 31 of a receptacle. Meanwhile, the component bonded and fixed to a magnet 32 can be a casing 33 of the receptacle. Such a structure can simplify the structure of the receptacle, and further enhance the bonding reliability of an optical isolator 130.

Additionally, in FIG. 3(a) also, the center of the magnetic flux (magnet center) is positioned closer to the bonded- and fixed-end surface side of the optical isolator chip 7 than the central position of the Faraday rotator 4 on the optical axis is. Hence, as shown in FIG. 3(b), a force for pressing the optical isolator chip 7 (the Faraday rotator 4) against the stub 31 of the receptacle is exerted, and enhances the bonding reliability of the optical isolator.

EXAMPLES

Hereinafter, the present invention will be more specifically described by showing Examples and Comparative Examples, but the present invention is not limited thereto.

Example 1

The optical isolator shown in FIG. 1(a) was produced as follows. First, $(TbEu)_2Bi_1Fe_{4.8}Ga_{0.2}O_{12}$ was used as the Faraday rotator 4, and polished (length: 0.60 mm) to have a Faraday rotation angle of 45 degrees at 25° C. for light having 1550 nm wavelength. Further, AR coating films against epoxy were formed on both end surfaces of the Faraday rotator 4.

Next, polarizing glasses (the second polarizer 5, the first polarizer 3) having AR coating films against air formed at a light-entering surface side and a light-exiting surface side were prepared, and bonded and fixed to the Faraday rotator 4 with an epoxy adhesive. This assembly was cut into a 0.8-mm square (having a squared cross section with each side of 0.8 mm). Thus, the optical isolator chip 7 was prepared.

Then, the light-exiting end surface of the optical isolator chip 7 and the SmCo magnet 12 (outer diameter: 2 mm, inner diameter: 1.3 mm, length: 0.4 mm) were adhered and fixed to the metal holder (first component) 11 to produce the optical isolator 110. In this case, as shown in FIG. 1(b), the center of the magnetic flux (magnet center) formed by the magnet 12 on the optical axis was positioned closer to the light-exiting end surface side (left side) than the central position of the Faraday rotator 4 on the optical axis (FR center) was. Moreover, the forward insertion loss of the produced optical isolator 110 was 0.14 dB, and the isolation was 43 dB.

In the optical isolator 110 of Example 1, the weight, volume, and cost of the magnet were each reduced to approximately 4/15 of those of a magnet in an optical isolator of Comparative Example 1 (to be described later).

Further, in the step of incorporating the optical isolator 110 into a laser module, even when 1 hour elapsed at a temperature of 260° C., no abnormality was observed at the adhesion portion between the optical isolator chip 7 and the metal holder 11.

Example 2

The optical isolator shown in FIG. 2(a) was produced as follows. First, the optical isolator chip 7 was produced as in Example 1. Then, the light-exiting end surface of the optical isolator chip 7 and a SmCo magnet 22 (outer diameter: 2 mm, inner diameter: 1.3 mm, length: 0.6 mm) were adhered and fixed to a disc-shaped metal holder (second component) 21 to produce an optical isolator 120 as in Example 1. In Example 2, the shape of the metal holder and the size of the SmCo magnet differ from those in Example 1.

Figure 2:
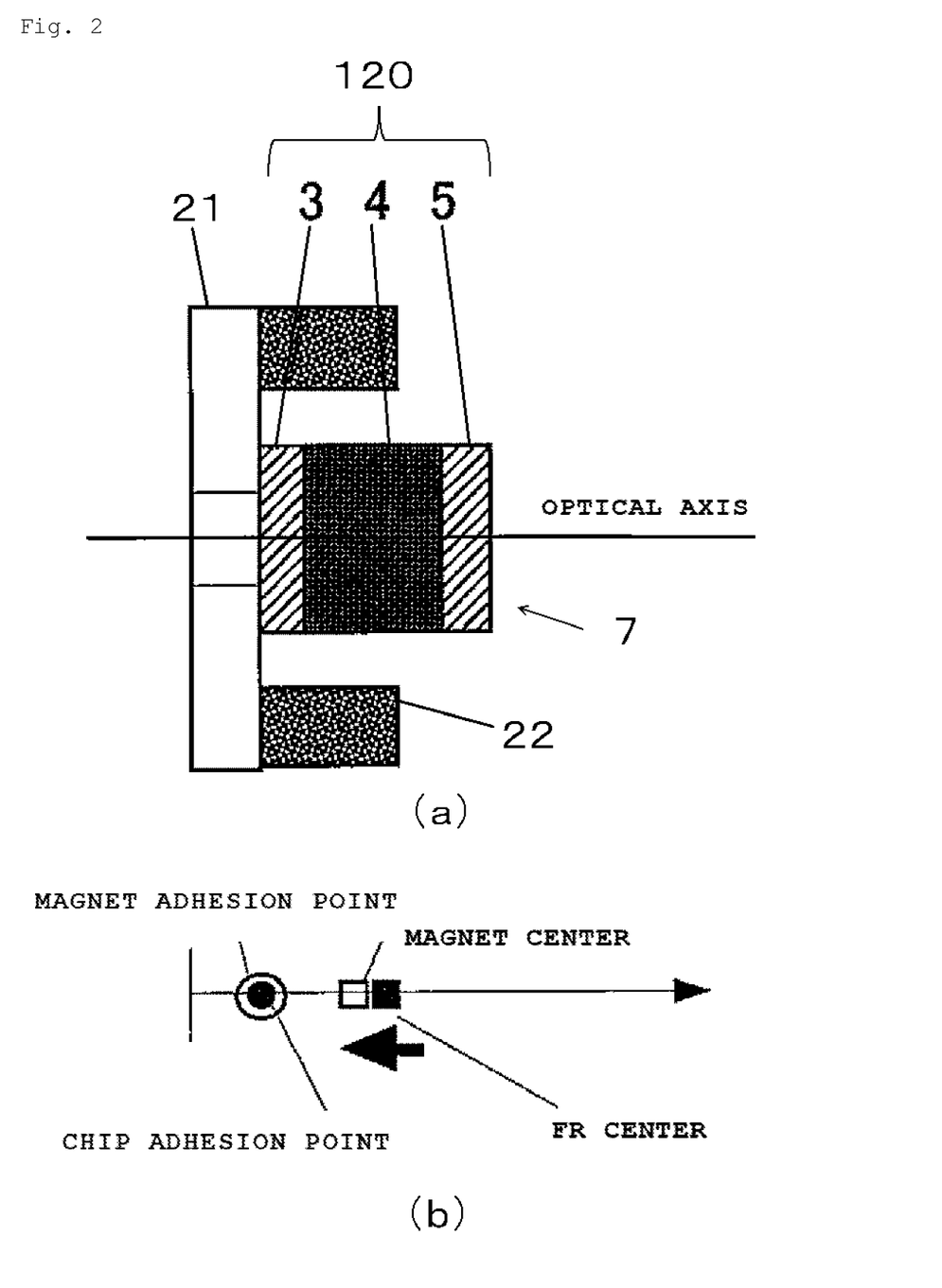

In this case, as shown in FIG. 2(b), the center of the magnetic flux formed by the magnet 22 on the optical axis was positioned closer to the light-exiting end surface side (left side) than the central position of the Faraday rotator 4 on the optical axis (FR center) was. Moreover, the forward insertion loss of the produced optical isolator 120 was 0.16 dB, and the isolation was 42 dB.

In the optical isolator 120 of Example 2, the weight, volume, and cost of the magnet were each reduced to approximately 6/15 of those of the magnet in the optical isolator of Comparative Example 1 to be described later.

Further, in the step of incorporating the optical isolator 120 into a laser module, even when 1 hour elapsed at a temperature of 260° C., no abnormality was observed at the adhesion end portion between the optical isolator chip 7 and the disc-shaped metal holder 21.

Example 3

The optical isolator shown in FIG. 3(a) was produced as follows. First, the optical isolator chip 7 was produced as in Example 1. Then, the light-exiting end surface of the optical isolator chip 7 was adhered and fixed to the stub (third component) 31 of the receptacle, and the SmCo magnet 32 (outer diameter: 2 mm, inner diameter: 1.3 mm, length: 0.8 mm) was adhered and fixed to the receptacle casing (fourth component) 33 to produce the optical isolator 130. Example 3 differs from Examples 1 and 2 in that the component bonded and fixed to the optical isolator chip 7 and the component bonded and fixed to the magnet 32 were integrated to form a single part, and that the end surface of the component (the stub 31) bonded and fixed to the optical isolator chip 7 is tilted away from the optical axis.

In this case, as shown in FIG. 3(b), the center of the magnetic flux formed by the magnet 32 on the optical axis was positioned closer to the light-exiting end surface side (left side) than the central position of the Faraday rotator 4 on the optical axis (FR center) was. Moreover, the forward insertion loss of the produced optical isolator 130 was 0.15 dB, and the isolation was 43 dB.

In the optical isolator 130 of Example 3, the weight, volume, and cost of the magnet were each reduced to approximately 8/15 of those of the magnet in the optical isolator of Comparative Example 1.

Further, in the step of incorporating the optical isolator 130 into a laser module, even when 10 hours elapsed at a temperature of 150° C., no abnormality was observed at the adhesion portion between the optical isolator chip 7 and the stub 31.

Example 4

Figure 4:
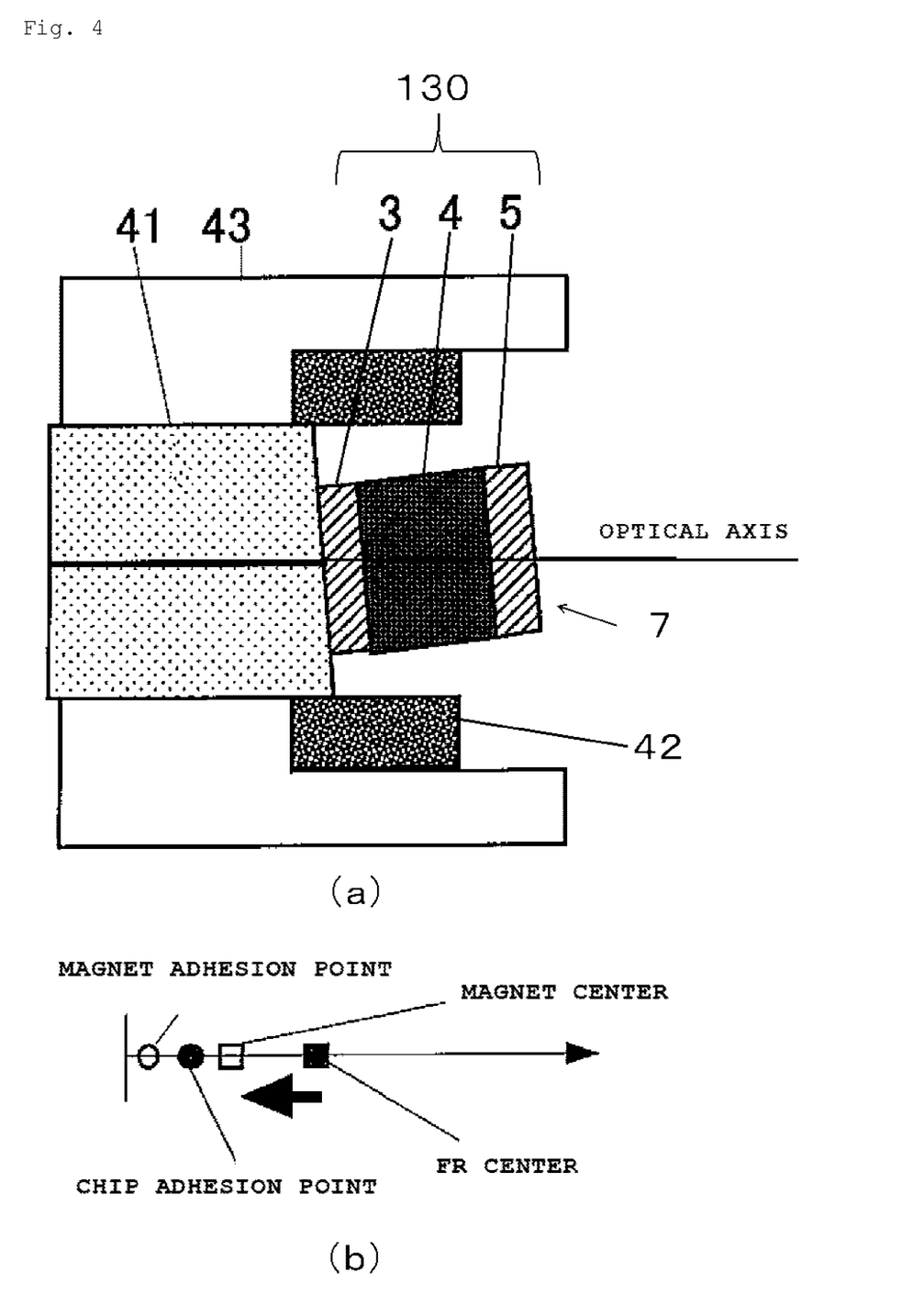

As shown in FIG. 4(a), in this Example, one end of a casing 43 of a receptacle was extended such that the light-entering end surface of the optical isolator chip 7 did not protrude outwardly from the magnet and the position of the end surface of the component, as compared with the optical isolator 130 of Example 3 shown in FIG. 3(a). The SmCo magnet 42 was the same as the SmCo magnet 32, and a stub 41 of the receptacle was the same as the stub 31 of the receptacle.

This makes it possible to avoid a possibility of a crack or the like which would be otherwise formed in the end surface of the optical isolator chip 7 abutting on a lens casing or the like during the incorporation into a laser module.

Comparative Example 1

The optical isolator shown in FIG. 5(*a*) was produced as follows. First, $(TbEu)_2Bi_1Fe_{4.8}Ga_{0.2}O_{12}$ was used as the Faraday rotator 4, and polished (length: 0.60 mm) to have a Faraday rotation angle of 45 degrees at 25° C. for light having 1550 nm wavelength. Further, AR coating films against epoxy were formed on both end surfaces of the Faraday rotator 4.

Next, polarizing glasses (the second polarizer 5, the first polarizer 3) having AR coating films against air formed at a light-entering surface side and a light-exiting surface side were prepared, and bonded and fixed to the Faraday rotator 4 with an epoxy adhesive. This assembly was cut into a 0.8-mm square. Thus, the optical isolator chip 7 was prepared.

Then, the light-exiting end surface of the optical isolator chip 7 and the SmCo magnet 62 (outer diameter: 2 mm, inner diameter: 1.3 mm, length: 1.5 mm) were adhered and fixed to the metal holder 11 to produce the optical isolator 200. In the structure of this case, the light-entering end surface of the optical isolator chip 7 generally does not protrude from the end portion of the magnet 62 not bonded and fixed to the metal holder 11. Moreover, the center of the magnetic flux (magnet center) formed by the magnet 62 on the optical axis was positioned at the light-entering end surface side (right side) of the central position of the Faraday rotator 4 on the optical axis (FR center). Further, the forward insertion loss of the produced optical isolator 200 was 0.15 dB, and the isolation was 42 dB.

In the step of incorporating the optical isolator 200 into a laser module, when 10 hours elapsed at a temperature of 150° C., the adhesion portion between the optical isolator chip 7 and the metal holder 11 broke and detached.

Figure 5:
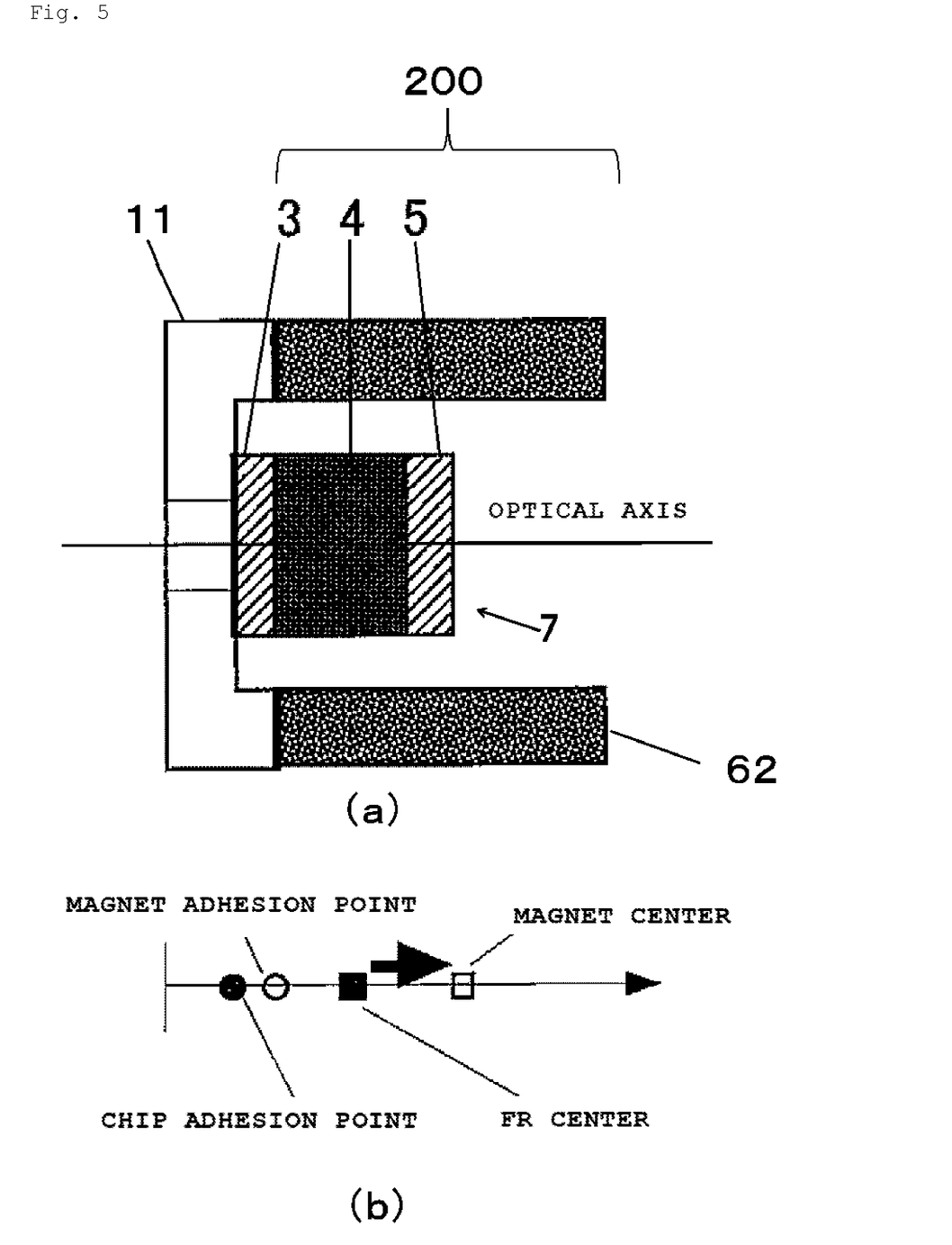

This is conceivably because when the optical isolator 200 became so hot that the epoxy adhesive was softened, a force in a direction of the center of the magnetic flux (magnet center) acted on the Faraday rotator 4 made of a magnetic material (see FIG. 5(*b*)).

In addition, since the weight and volume of the magnet in Comparative Example 1 were greater than those of Examples 1 to 4, it was difficult to make an optical isolator compact (saving space, light weight) and reduce the cost.

It should be noted that the present invention is not restricted to the above-described embodiments. The embodiments are merely examples so that any embodiments that have substantially the same feature and demonstrate the same functions and effects as those in the technical concept as disclosed in claims of the present invention are included in the technical scope of the present invention.

The invention claimed is:

1. An optical isolator comprising:
   an optical isolator chip comprising a first polarizer, a Faraday rotator made of a ferromagnet, and a second polarizer bonded and fixed in this order; and
   a magnet configured to apply a magnetic field to the optical isolator chip, wherein
   a light-entering end surface or a light-exiting end surface of the optical isolator chip is bonded and fixed to a component,
   an end portion of the magnet, which is on the same side of the component as the end surface side of the optical isolator chip bonded and fixed to the component, is bonded and fixed to a surface perpendicular to the optical axis of the component,
   on an optical axis of the optical isolator, a center of a magnetic flux formed by the magnet is positioned between a central position of the Faraday rotator on the optical axis and the end surface of the optical isolator chip bonded and fixed to the component,
   the light-entering end surface or the light-exiting end surface of the optical isolator chip not bonded and fixed to the component protrudes from an end portion of the magnet not bonded and fixed to the component, and
   along the optical axis of the optical isolator, a point at which the surface perpendicular to the optical axis of the component at which the end portion of the magnet is bonded to is located between a point at which the end surface side of the optical isolator chip is bonded to the component and a point at which the center of the magnetic flux is formed by the magnet.

2. The optical isolator according to claim 1, wherein the component bonded and fixed to the optical isolator chip is integrated with a component bonded and fixed to the magnet, so that a single part is formed.

3. The optical isolator according to claim 1, wherein the component bonded and fixed to the optical isolator chip is a stub of a receptacle.

4. The optical isolator according to claim 2, wherein the component bonded and fixed to the optical isolator chip is a stub of a receptacle.

5. The optical isolator according to claim 1, wherein a component bonded and fixed to the magnet is a casing of the receptacle.

6. The optical isolator according to claim 2, wherein a component bonded and fixed to the magnet is a casing of the receptacle.

7. The optical isolator according to claim 3, wherein the component bonded and fixed to the magnet is a casing of the receptacle.

8. The optical isolator according to claim 4, wherein the component bonded and fixed to the magnet is a casing of the receptacle.

* * * * *